(12) United States Patent
Chiu et al.

(10) Patent No.: US 9,128,673 B2
(45) Date of Patent: Sep. 8, 2015

(54) INTEGRATED MECHANISM FOR AN ELECTRONIC DEVICE AND AN ADAPTOR

(71) Applicant: Quanta Computer Inc., Kuei Shan Hsiang, Tao Yuan Shien (TW)

(72) Inventors: Chia-Hsiang Chiu, Tao Yuan Shien (TW); Hsien-Ching Tsai, Tao Yuan Shien (TW); Wei-Cheng Huang, Tao Yuan Shien (TW); Po-Hsien Huang, Tao Yuan Shien (TW); Hung-Hsuan Su, Tao Yuan Shien (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 564 days.

(21) Appl. No.: 13/673,133

(22) Filed: Nov. 9, 2012

(65) Prior Publication Data
US 2014/0029148 A1    Jan. 30, 2014

(30) Foreign Application Priority Data

Jul. 24, 2012   (TW) .............................. 101126552 A

(51) Int. Cl.
  *G06F 1/16*    (2006.01)
  *H05K 5/00*    (2006.01)
  *H05K 7/00*    (2006.01)

(52) U.S. Cl.
  CPC .............. *G06F 1/1635* (2013.01); *G06F 1/166* (2013.01); *G06F 1/1632* (2013.01); *G06F 1/1675* (2013.01); *G06F 1/1679* (2013.01)

(58) Field of Classification Search
  CPC ..... G06F 1/166; G06F 1/1632; G06F 1/1635; G06F 1/1675; G06F 1/1679
  USPC ............... 361/679.01, 679.02, 679.4, 679.41, 361/679.43, 679.44, 728, 732, 733, 747, 361/679.55, 679.59; 174/135
  See application file for complete search history.

(56) References Cited

U.S. PATENT DOCUMENTS 6,825,415 B1 *  11/2004  Chen et al. ...................... 174/63
7,273,089 B2 *   9/2007  Hata et al. ................ 165/104.33

* cited by examiner

*Primary Examiner* — Hoa C Nguyen
*Assistant Examiner* — Binh Tran
(74) *Attorney, Agent, or Firm* — McClure, Qualey & Rodack, LLP

(57) ABSTRACT

An integrated mechanism is disclosed. An electronic device includes a slot, an engaging groove, and a power input portion. The engaging groove communicates with the slot and the power input portion is disposed in the slot. An adaptor is detachably connected to the electronic device and includes a grip, a power line, an extended connection bar, a tenon, and a power output portion. The power line is connected to the grip. The extended connection bar is connected to the grip. The tenon is formed on the extended connection bar. The power output portion is formed on the extended connection bar and is electrically connected to the grip and power line. When the adaptor connects to the electronic device, the extended connection bar is inserted into the slot, the tenon is selectively engaged or rotated in the engaging groove, and the power output portion connects to the power input portion.

9 Claims, 9 Drawing Sheets

INTEGRATED MECHANISM FOR AN ELECTRONIC DEVICE AND AN ADAPTOR

CROSS REFERENCE TO RELATED APPLICATIONS

This Application claims priority of Taiwan Patent Application No. 101126552, filed on Jul. 24, 2012, the entirety of which is incorporated by reference herein.

BACKGROUND OF THE INVENTION

1. Field of the Invention

The invention relates to an integrated mechanism for an electronic device and an adaptor, and more particularly to an integrated mechanism that can provide extended functions for an adaptor 2. Description of the Related Art An adaptor is essential for a notebook computer (or an electronic mobile device). Nevertheless, as the adaptor is provided with a large size and a copious power line, an operator is often unwilling to carry the adaptor with the notebook computer. Moreover, as the notebook computer is often placed on a desk for use, a space between the bottom of the notebook computer and the desk is insufficient, resulting in poor air inhalation and heat dissipation.

Hence, there is a need for an integrated mechanism for an electronic device and an adaptor, utilizing the adaptor to selectively serve as a grip or a support stand for the electronic device, and further enhancing portability and heat dissipation of the electronic device.

BRIEF SUMMARY OF THE INVENTION

A detailed description is given in the following embodiments with reference to the accompanying drawings.

An exemplary embodiment of the invention provides an integrated mechanism comprising an electronic device and an adaptor. The electronic device comprises at least one slot, at least one engaging groove, and a power input portion. The engaging groove communicates with the slot and the power input portion is disposed in the slot. The adaptor is detachably connected to the electronic device and comprises a grip, a power line, at least one extended connection bar, at least one tenon, and a power output portion. The power line is connected to the grip. The extended connection bar is connected to the grip. The tenon is formed on the extended connection bar. The power output portion is formed on the extended connection bar and is electrically connected to the grip and power line. When the adaptor is connected to the electronic device, the extended connection bar is inserted into the slot, the tenon is selectively engaged or rotated in the engaging groove, and the power output portion is connected to the power input portion.

The power line is wrapped around the extended connection bar.

The extended connection bar comprises a plurality of recessed grooves alternately arranged to oppose each other. The power line is received in the recessed grooves when the power line is wrapped around the extended connection bar.

The electronic device further comprises at least two resilient retardant members disposed in the engaging groove and opposite to each other. When the adaptor is connected to the electronic device, the tenon is selectively engaged or rotated in the engaging groove via the resilient retardant members and is retarded and positioned by the resilient retardant members.

The power input portion comprises a breach preventing short circuit when the power output portion is connected to the power input portion.

The power output portion comprises a breach preventing short circuit when the power output portion is connected to the power input portion.

The profile of the engaging groove is complementary to that of the tenon.

The tenon and power output portion are respectively formed on two opposite sides of the extended connection bar.

The electronic device comprises a portable computer.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
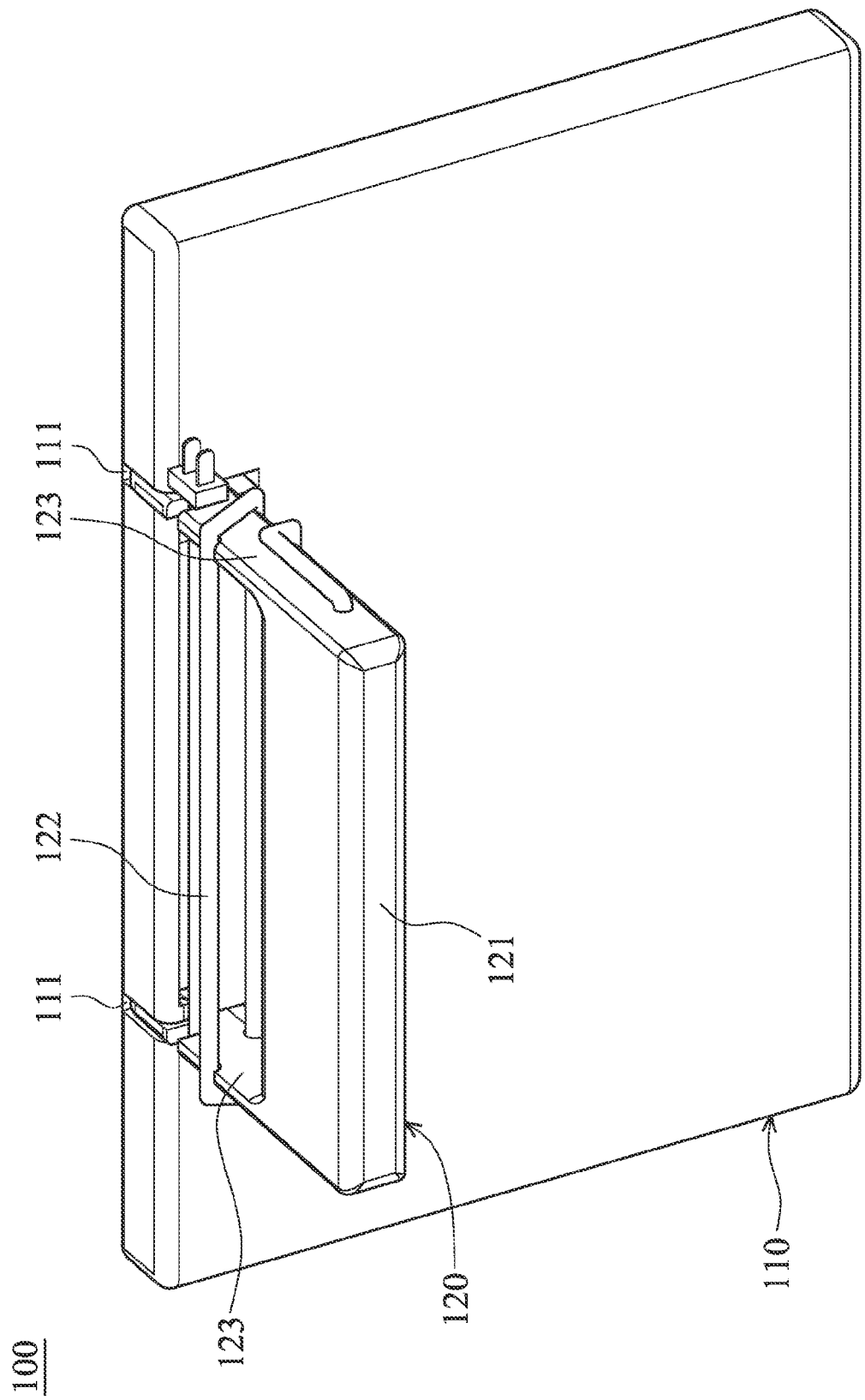
FIG. 1A is a perspective assembly view of an integrated mechanism of the invention in a first operational mode.
Figure 1B:
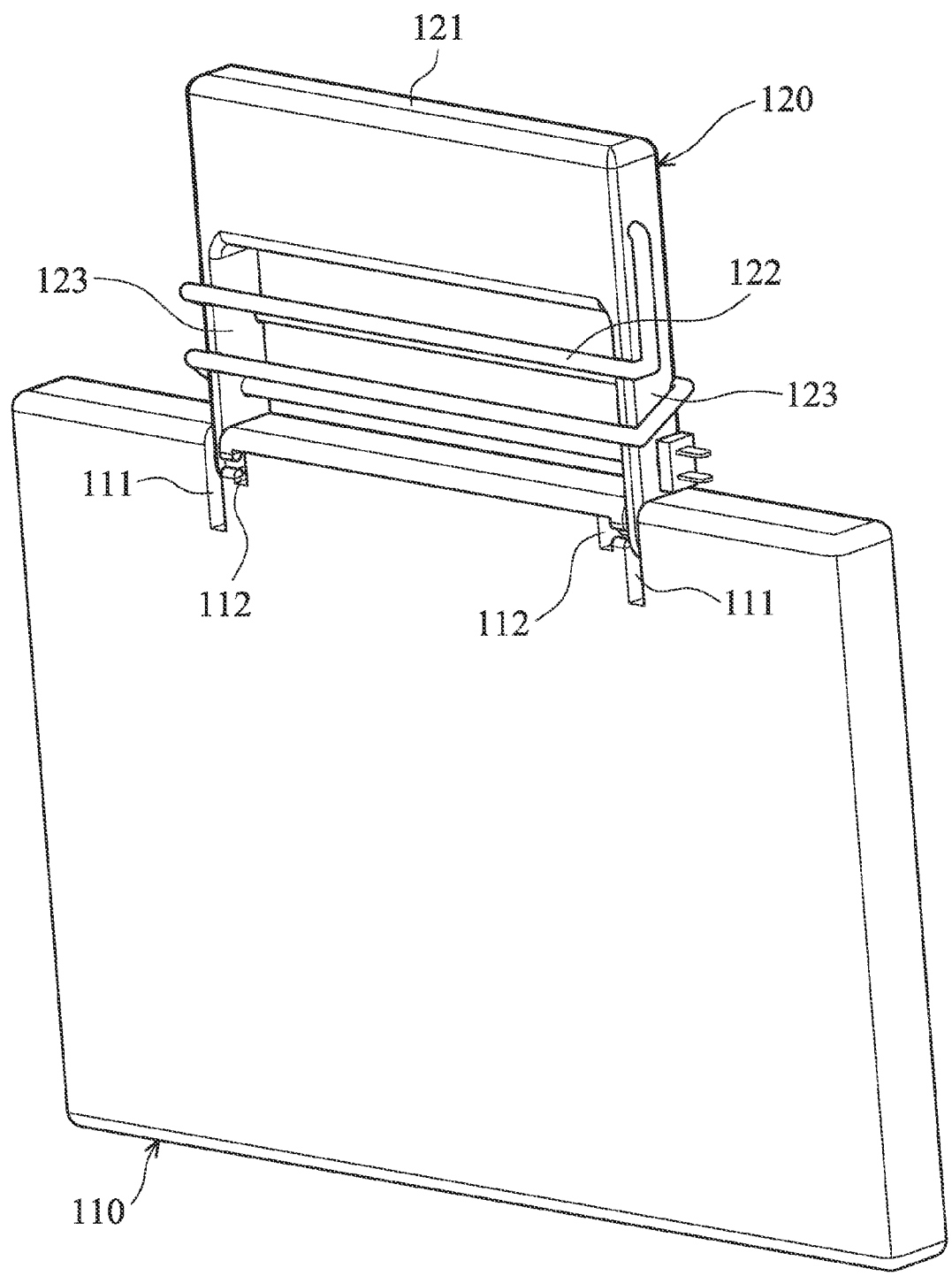
FIG. 1B is a perspective assembly view of the integrated mechanism of the invention in a second operational mode.
Figure 2:
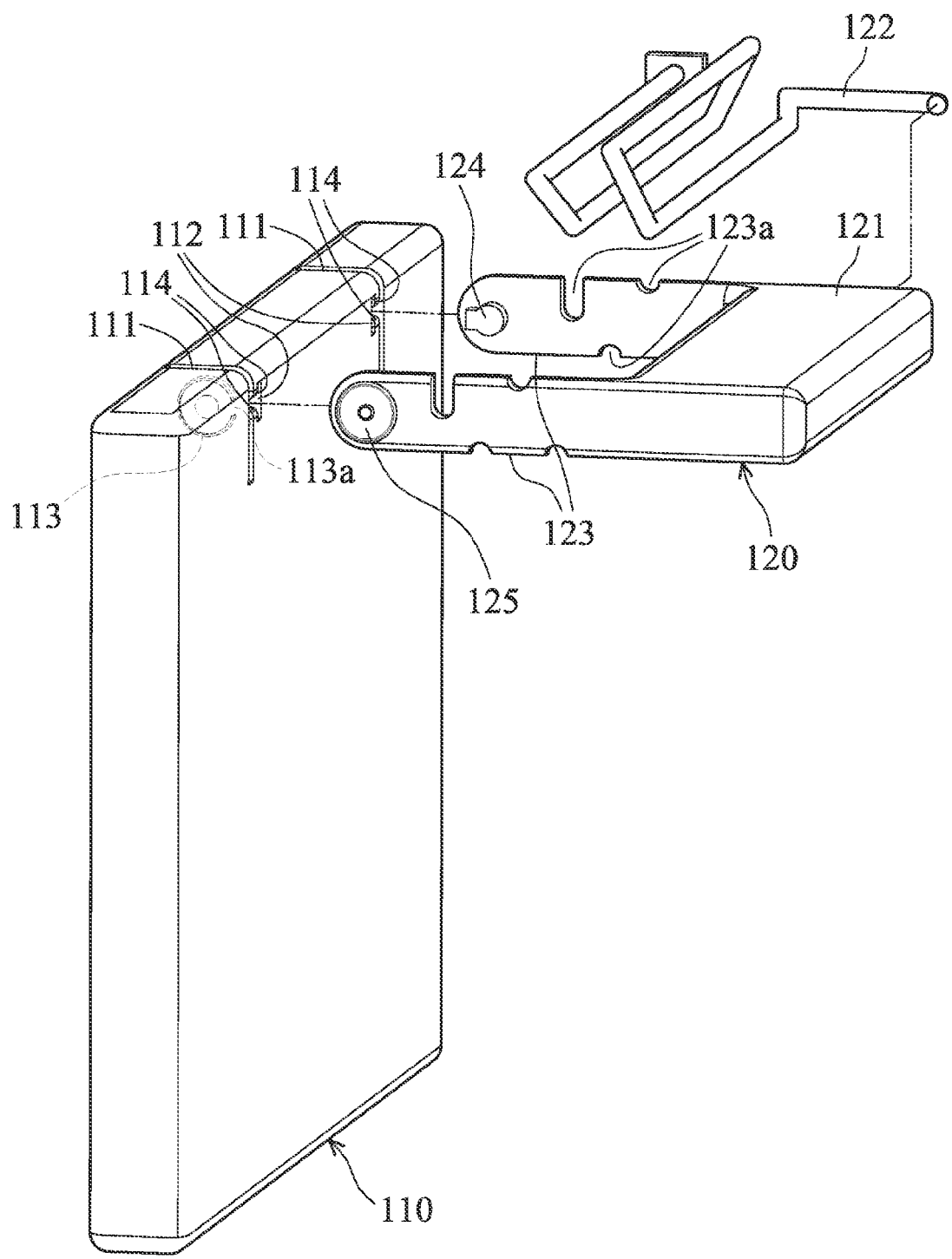
FIG. 2 is an exploded perspective view of the integrated mechanism of the invention.

Referring to FIGS. 1A, 1B, and 2, an integrated mechanism 100 comprises an electronic device 110 and an adaptor 120. Here, the electronic device 110 may be a portable computer (e.g. a notebook computer) or an electronic mobile device.

Figure 3:
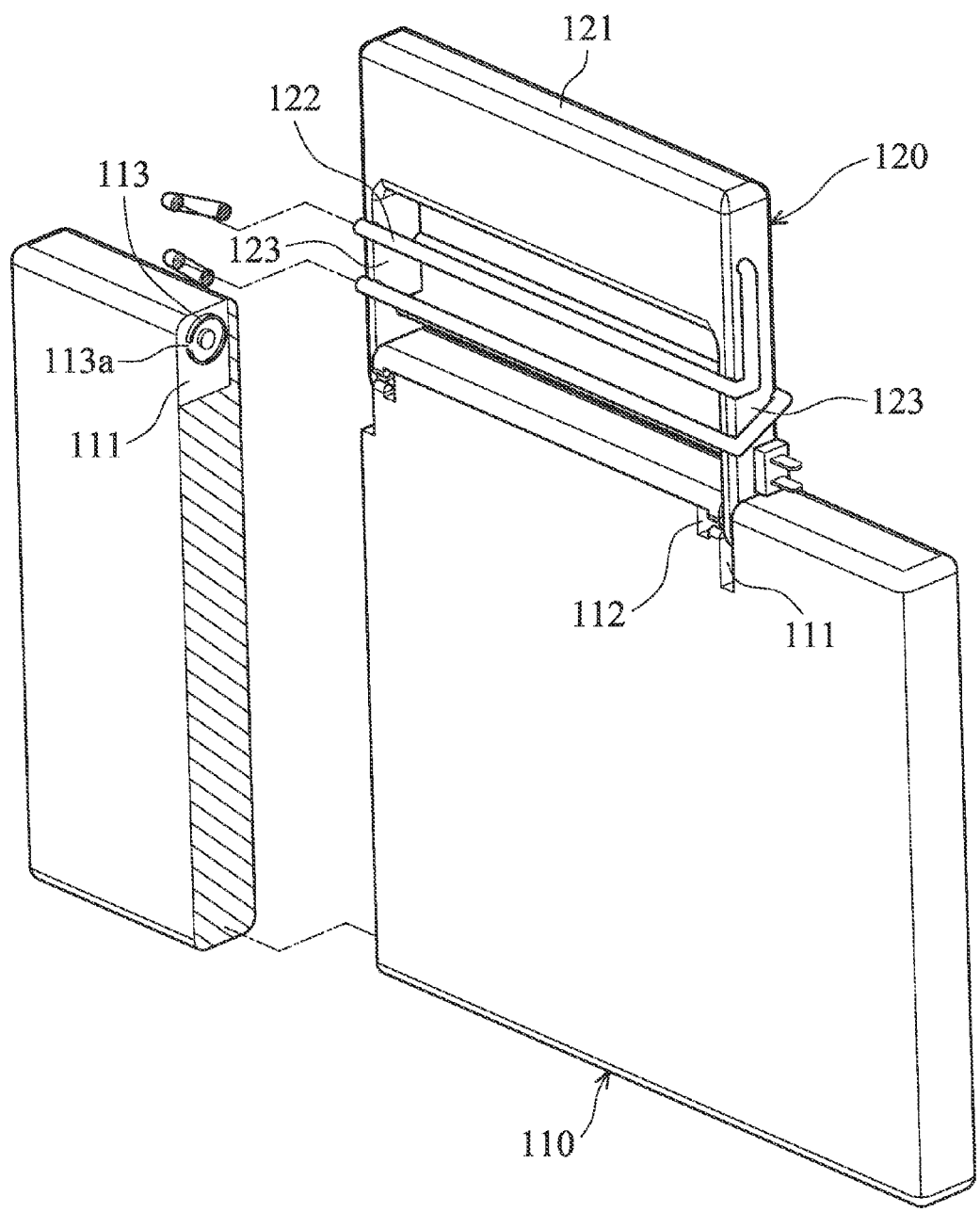
FIG. 3 is a schematic cross section of the integrated mechanism of the invention in the second operational mode.
Figure 4:
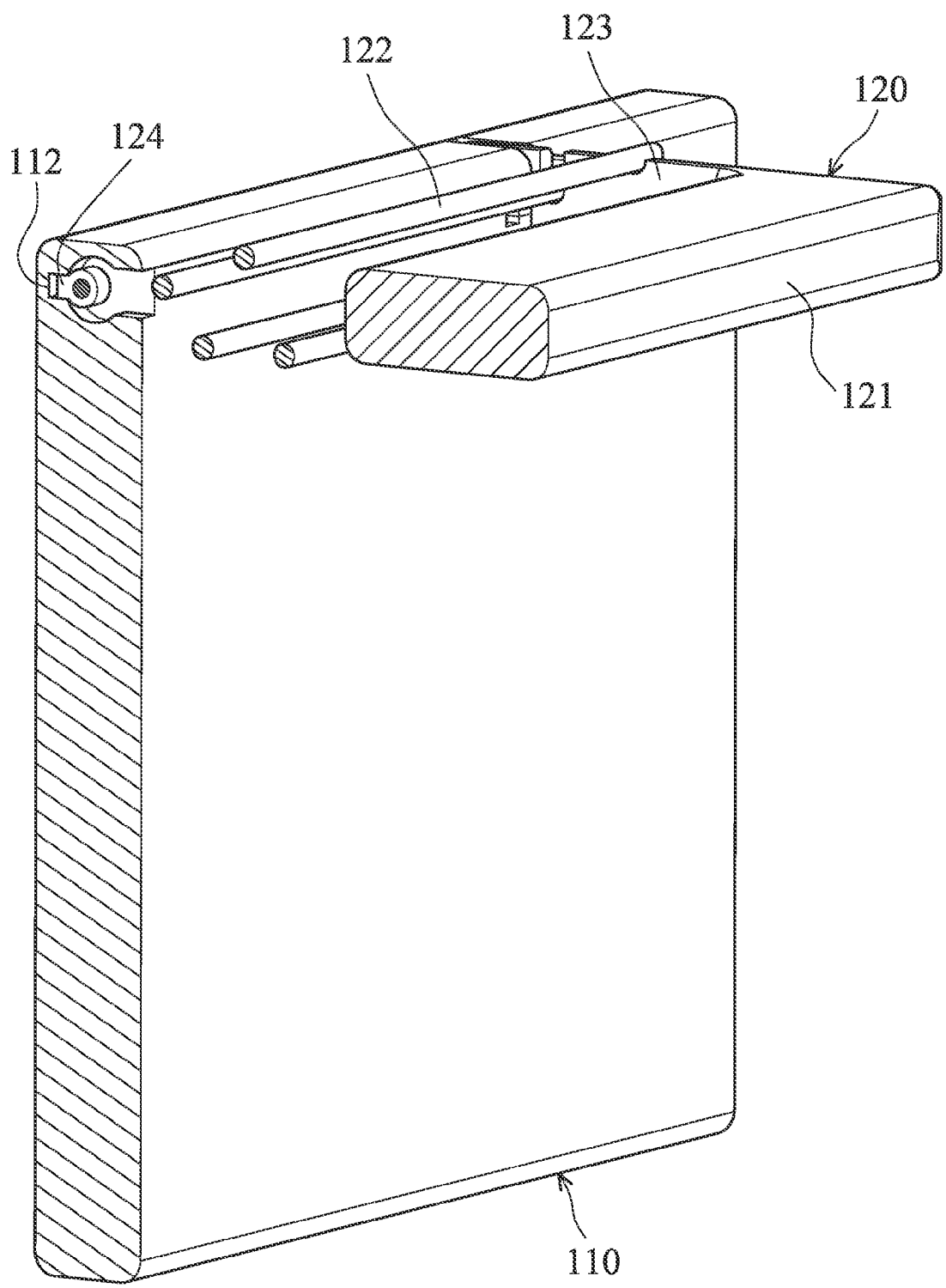
FIG. 4 is a perspective cross section of the integrated mechanism of the invention in the first operational mode.
Figure 5:
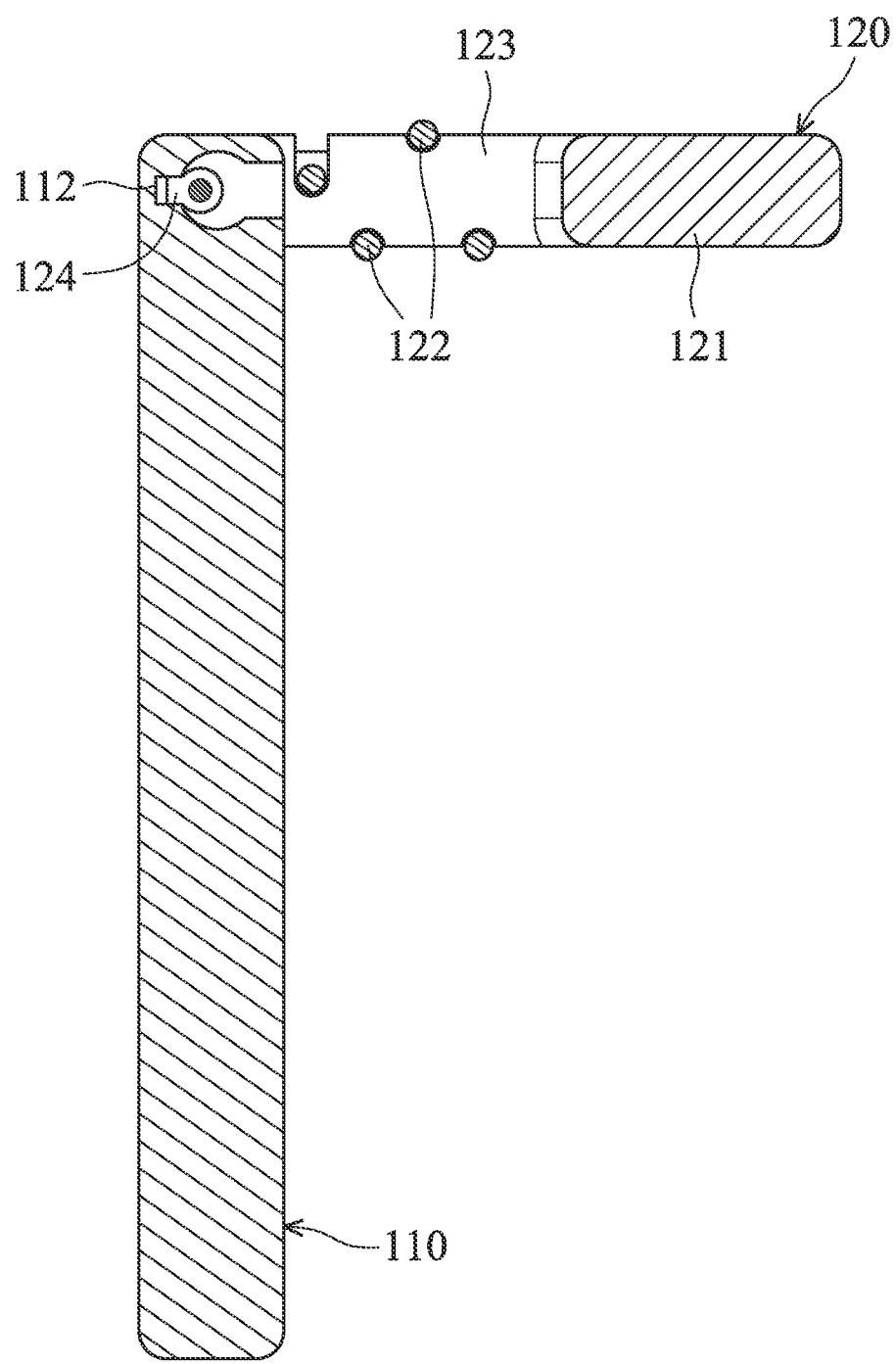
FIG. 5 is a schematic cross section of the integrated mechanism of the invention in the first operational mode.

As shown in FIG. 2, the electronic device 110 comprises two slots 111, two engaging grooves 112, a power input portion 113, and a plurality of resilient retardant members 114. Each engaging groove 112 communicates with each slot 111. The power input portion 113 is disposed in one of the slots 111. Here, as shown in FIG. 2 and FIG. 3, the power input portion 113 comprises a breach 113a. Specifically, the power input portion 113 may be composed of an outer anode ring and a central cathode protrusion and the breach 113a is formed on the outer anode ring.

As shown in FIG. 2, two resilient retardant members 114 opposite to each other are disposed in each engaging groove 112. The adaptor 120 is detachably connected to the electronic device 110 and comprises a grip 121, a power line 122, two opposite extended connection bars 123, two tenons 124, and a power output portion 125.

In this embodiment, main circuitry of the adaptor 120 is disposed in the grip 121, and the power line 122 is connected to the grip 121.

Each extended connection bar 123 is connected to the grip 121. Here, the power line 122 may be wrapped around the extended connection bars 123. Specifically, each extended connection bar 123 may comprise a plurality of recessed grooves 123a alternately arranged to oppose each other. Thus, as shown in FIGS. 1A, 1B, and 2, when being wrapped around the extended connection bars 123, the power line 122 is received in the recessed grooves 123a.

Figure 6:
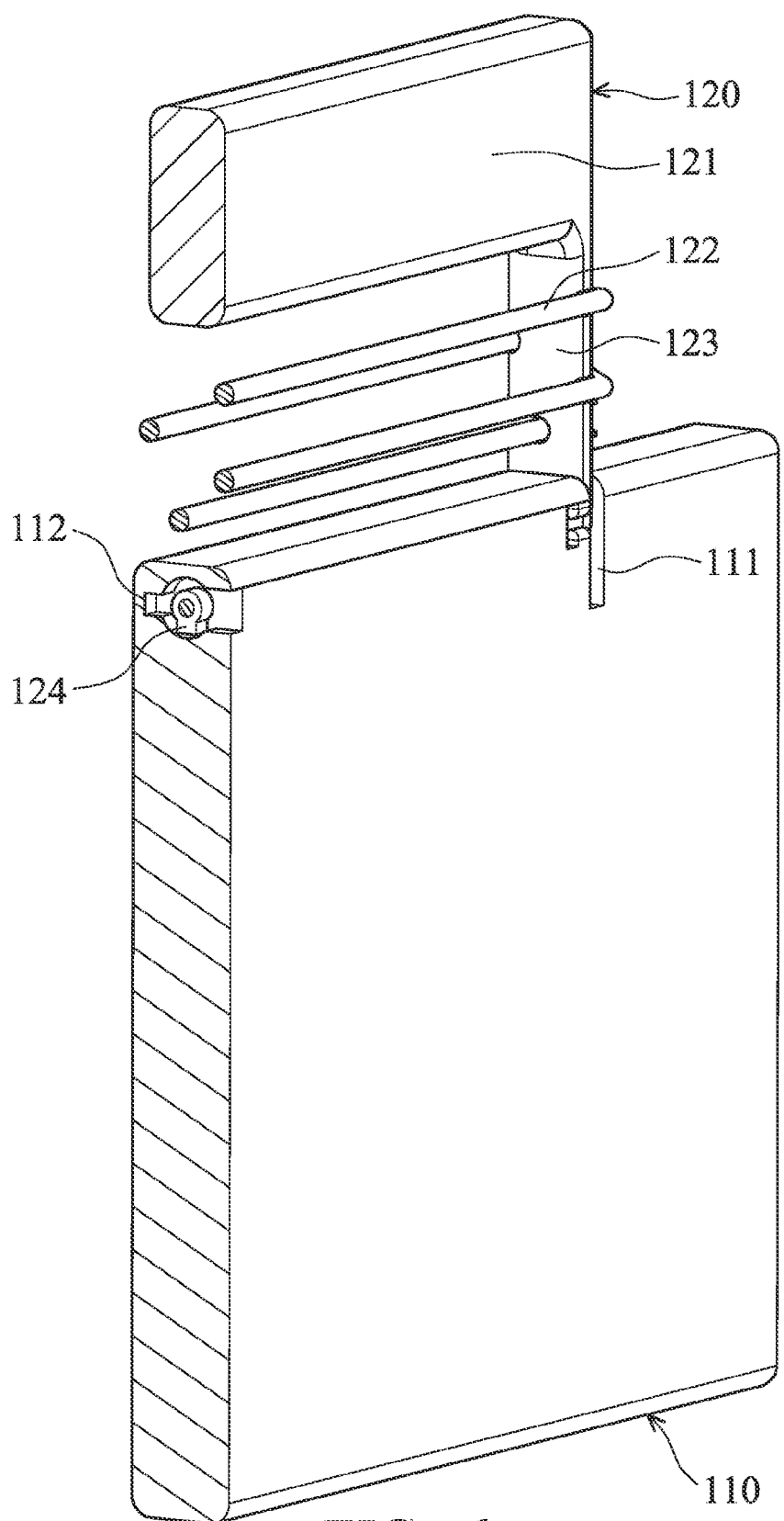
FIG. 6 is a perspective cross section of the integrated mechanism of the invention in the second operational mode.
Figure 7:
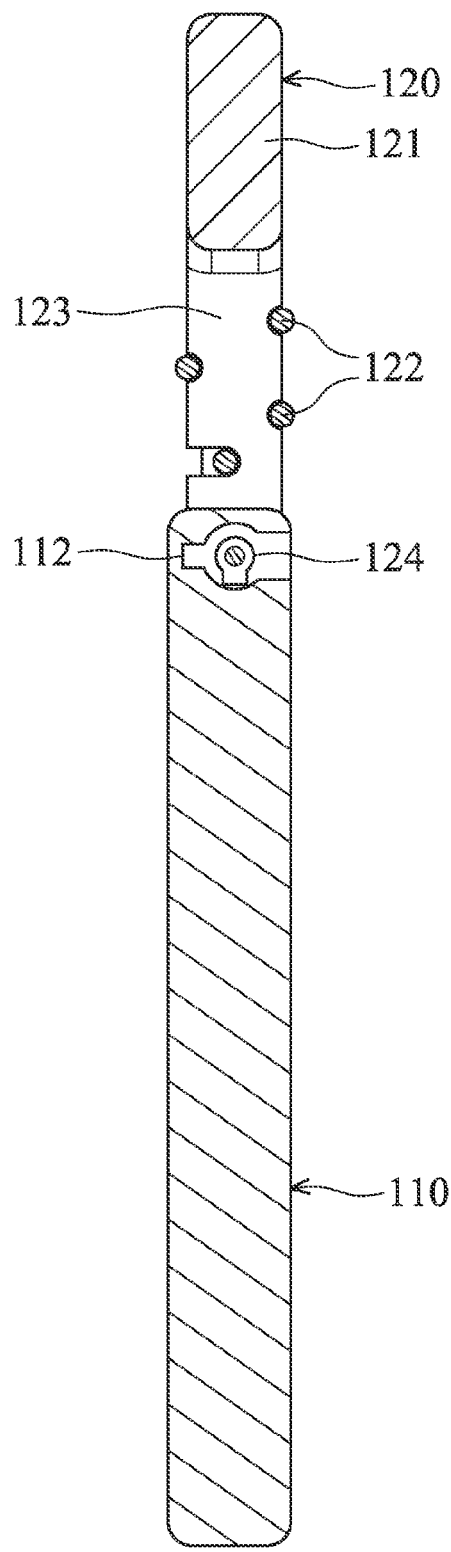
FIG. 7 is a schematic cross section of the integrated mechanism of the invention in the second operational mode.
Figure 8:
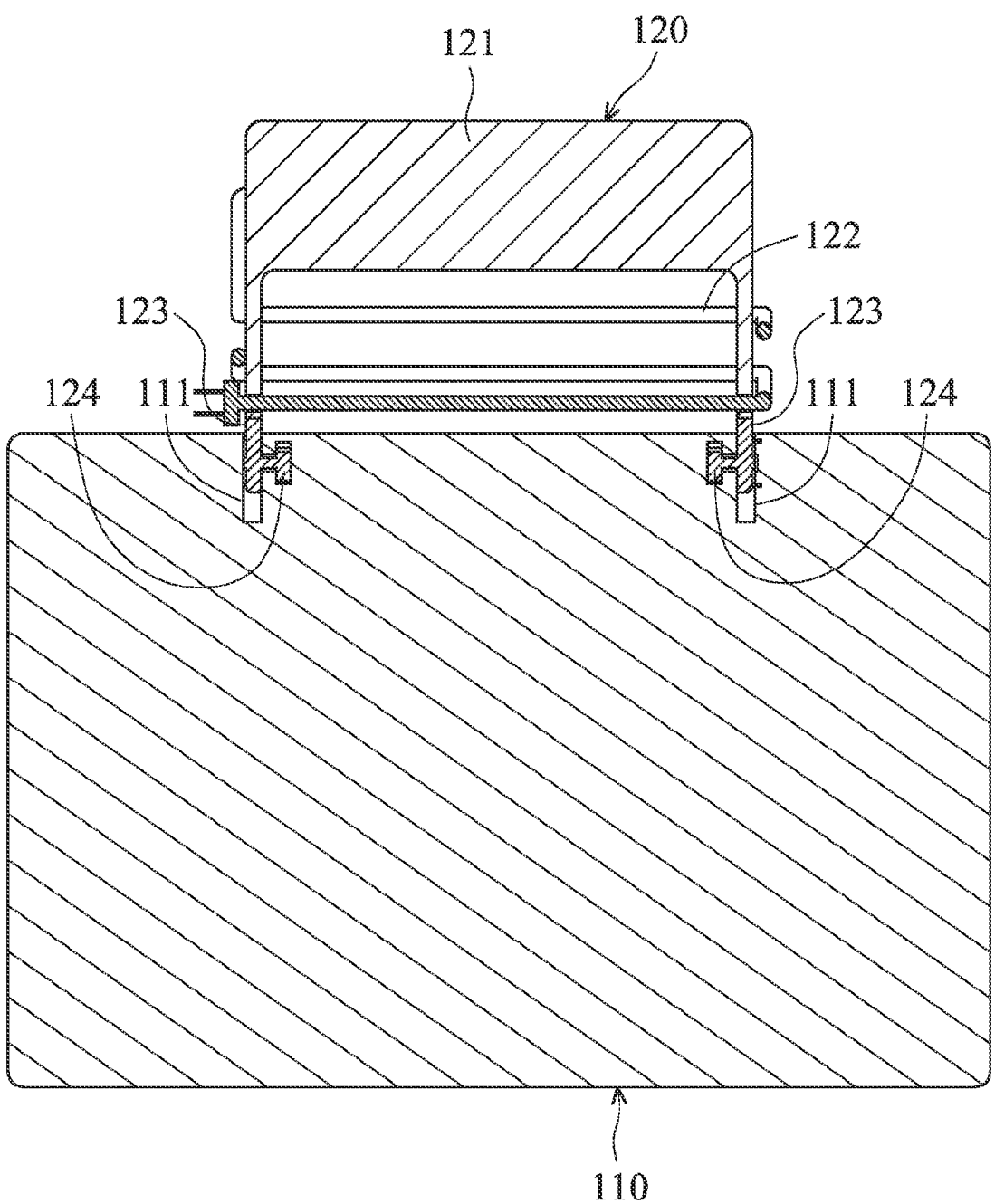
FIG. 8 is another schematic cross section of the integrated mechanism of the invention in the second operational mode.

As shown in FIGS. 2, 4, 5, 6, and 7, each tenon 124 is formed on each extended connection bar 123 and is selectively engaged in each engaging groove 112 (FIG. 4 and FIG. 5) or rotated in each engaging groove 112 (FIG. 6 and FIG. 7). Moreover, the profile of each engaging groove 112 may be complementary to that of each tenon 124.

As shown in FIG. 2, the power output portion 125 is formed on one of the extended connection bars 123 and is electrically connected to the grip 121 and power line 122. Specifically, the power output portion 125 is formed on the extended connection bar 123 corresponding to the power input portion 113, and the tenon 124 and power output portion 125 are respectively formed on two opposite sides of one of the extended connection bars 123. Moreover, the power output portion 125 may also comprise a breach (not shown) and may be composed of an outer cathode ring and a central anode protrusion to match the power input portion 113.

The following description is directed to operation of the integrated mechanism 100.

As shown in FIGS. 1A, 2, 4, and 5, when the adaptor 120 is connected to the electronic device 110, the extended connection bars 123 are inserted into the slots 111, respectively. Here, the tenon 124 formed on each extended connection bar 123 is engaged in each engaging groove 112 via the resilient retardant members 114 and is retarded and positioned by the resilient retardant members 114. At the same time, the power output portion 125 is connected to the power input portion 113. Specifically, as the power output portion 125 or power input portion 113 comprises a breach, short circuit is not generated between the power output portion 125 and the power input portion 113 during early connection of the power output portion 125 and power input portion 113.

Accordingly, as a specific angle is provided between the adaptor 120 and the electronic device 110 due to each tenon 124 engaged in each engaging groove 112, as shown in FIG. 1A, the adaptor 120 can serve as a support stand when the integrated mechanism 100 is placed on a desk for use, enhancing operational comfort for an operator and heat dissipation for the integrated mechanism 100 (i.e. as the bottom of the integrated mechanism 100 is raised by the adaptor 120 serving as the support stand, air inhalation and heat dissipation is further unhindered).

In another aspect, when the integrated mechanism 100 is to be carried by the operator, the operator can slightly pull the grip 121 of the adaptor 120, forcing the tenon 124 formed on each extended connection bar 123 to separate from each engaging groove 112. At this point, as shown in FIGS. 1B, 6, 7, and 8, each tenon 124 can freely rotate in each engaging groove 112 and is not separated from each engaging groove 112 by retardation of the resilient retardant members 114. Then, the operator can directly lift the grip 121 of the adaptor 120 to carry and move the integrated mechanism 100, similar to a briefcase.

In conclusion, as the disclosed integrated mechanism integrates the adaptor with the electronic device, the operator no longer has to carry the adaptor with a copious power line.

Namely, the adaptor can be provided with functions of extended use, enhancing operational convenience and comfort of the electronic device.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An integrated mechanism, comprising:
an electronic device comprising at least one slot, at least one engaging groove, and a power input portion, wherein the engaging groove communicates with the slot and the power input portion is disposed in the slot; and
an adaptor detachably connected to the electronic device and comprising a grip, a power line, at least one extended connection bar, at least one tenon, and a power output portion, wherein the power line is connected to the grip, the extended connection bar is connected to the grip, the tenon is formed on the extended connection bar, the power output portion is formed on the extended connection bar and is electrically connected to the grip and power line, when the adaptor is connected to the electronic device, the extended connection bar is inserted into the slot, the tenon is selectively engaged or rotated in the engaging groove, and the power output portion is connected to the power input portion.

2. The integrated mechanism as claimed in claim 1, wherein the power line is wrapped around the extended connection bar.

3. The integrated mechanism as claimed in claim 2, wherein the extended connection bar comprises a plurality of recessed grooves alternately arranged to oppose each other, and the power line is received in the recessed grooves when the power line is wrapped around the extended connection bar.

4. The integrated mechanism as claimed in claim 1, wherein the electronic device further comprises at least two resilient retardant members disposed in the engaging groove and opposite to each other, and when the adaptor is connected groove via the resilient retardant members and is retarded and positioned by the resilient retardant members.

5. The integrated mechanism as claimed in claim 4, wherein the power input portion comprises a breach preventing short circuit when the power output portion is connected to the power input portion.

6. The integrated mechanism as claimed in claim 1, wherein the power output portion comprises a breach preventing short circuit when the power output portion is connected to the power input portion.

7. The integrated mechanism as claimed in claim 1, wherein the profile of the engaging groove is complementary to that of the tenon.

8. The integrated mechanism as claimed in claim 1, wherein the tenon and power output portion are respectively formed on two opposite sides of the extended connection bar.

9. The integrated mechanism as claimed in claim 1, wherein the electronic device comprises a portable computer.

* * * * *